United States Patent [19]

San Juan

[11] Patent Number: 5,018,437
[45] Date of Patent: May 28, 1991

[54] TOASTER

[76] Inventor: Antonio B. San Juan, Diagonal 622, E - Barcelona 21, Spain

[21] Appl. No.: 506,337

[22] Filed: Apr. 9, 1990

[30] Foreign Application Priority Data

Apr. 7, 1989 [FR] France .............................. 89 04625

[51] Int. Cl.⁵ ............................................. A47J 37/08
[52] U.S. Cl. .................................. 99/327; 99/329 RT; 99/332; 99/389; 219/492; 219/502
[58] Field of Search ................. 99/327, 329 P, 329 RT, 99/329 R, 332, 389, 391, 399, 402; 219/385, 502, 492

[56]     References Cited
        U.S. PATENT DOCUMENTS

| 2,330,644 | 9/1943 | Uhlrig . | |
|---|---|---|---|
| 2,503,960 | 4/1950 | McCullough | 99/327 |
| 2,673,516 | 3/1954 | Reichold | 99/327 |
| 2,878,748 | 3/1959 | Stanek | 99/329 P |
| 3,869,970 | 3/1975 | Eagle | 99/329 R |
| 3,956,978 | 5/1976 | Borley | 219/502 |
| 4,154,151 | 5/1979 | Mochizuki | 99/329 R |
| 4,188,865 | 2/1980 | Bjarsch | 99/327 |
| 4,510,376 | 4/1985 | Schneider | 219/492 |
| 4,755,656 | 7/1988 | Charlesworth et al. | 219/492 |
| 4,878,423 | 11/1989 | Bikert et al. | 99/391 |

FOREIGN PATENT DOCUMENTS 2052607  5/1972  Fed. Rep. of Germany ........ 99/327

Primary Examiner—Timothy F. Simone
Attorney, Agent, or Firm—Young & Thompson

[57]     ABSTRACT

Toaster comprising a housing (1), a heating resistance controlled by a switch (2) associated with a timer, a breed carriage (3) guided within the housing and adapted to occupy at least two positions, namely a toasting position in which the carriage (3) closes the switch (2) actuating the timer, and in which the carriage (3) is moved by the user and maintained during the toasting cycle by a catch (5) operated by an electromagnet (6) which comes into engagement with an abutment (7) of the carriage (3), or a rest position into which the carriage (3) is moved by a return spring (8), at the end of the toasting cycle, when the catch (5) frees the abutment (7). The toaster also has a hot-keeping device for the toast which comprises a movable latch (9) adapted to occupy two positions, namely a hot-keeping position in which at the end of the toasting cycle the carriage (3) being displaced slightly toward its rest position so as to open the switch (2), the movable latch (9) is in engagement with a hook (11) carried by the carriage (3)to prevent further displacement of the carriage thereby to retain the toast in the toaster, or an automatic ejection position in which the latch (9) is withdrawn and does not prevent the displacement of the carriage (3) to eject the toast from the toaster.

5 Claims, 1 Drawing Sheet

TOASTER

The invention relates to a toaster comprising a housing, a heating resistance controlled by a switch associated with a timer, a bread carriage guided within the housing.

The invention relates more particularly to toasters whose carriage can occupy at least two positions, either a toasting position in which the carriage closes the switch starting the timer, and to which the carriage is moved by the user and maintained during the toasting cycle by a catch moved by an electromagnet which engages an abutment of the carriage, or a rest position to which the carriage is moved by means of a return spring, at the end of the toasting cycle, when the catch releases the abutment.

In toasters of this type, when the toasting cycle is over, the carriage is moved rapidly toward its rest position so as to eject the toast from the toaster. However, that has the drawback of letting the toast cool if the user does not immediately consume it. Certain toasters have a special supplemental chamber, in which the bread, ejected after toasting, is kept hot. This has the drawback of substantially increasing the volume and cost of the apparatus.

The invention has for its object to overcome these drawbacks and to provide a toaster permitting either the automatic ejection of the toast, or the keeping of the toast hot in the toasting chamber.

According to the invention, the toaster further comprises a device for keeping the toast hot which includes a movable latch which can occupy two positions, either a so-called heat-keeping position in which at the end of the toasting cycle, the carriage being slightly displaced toward its rest position so as to open the switch, the movable latch engages with a hook carried by the carriage, or an automatic ejection position in which the latch is retracted and does not impede movement of the carriage.

The invention thus has the advantage of providing a toaster permitting at the end of the toasting cycle either the automatic ejection of the toast from the toaster, or the keeping hot of the toast in this toasting chamber, thus utilizing the residual heat which prevails there, the sheet metal of the toaster giving off the heat stored during toasting. Moreover, the invention having a very simple mechanical structure, this device is less costly and permits mass production.

Other characteristics and advantages of the invention will appear from the description which follows, by way of example, with reference to the accompanying drawing in which.

Figure 1:
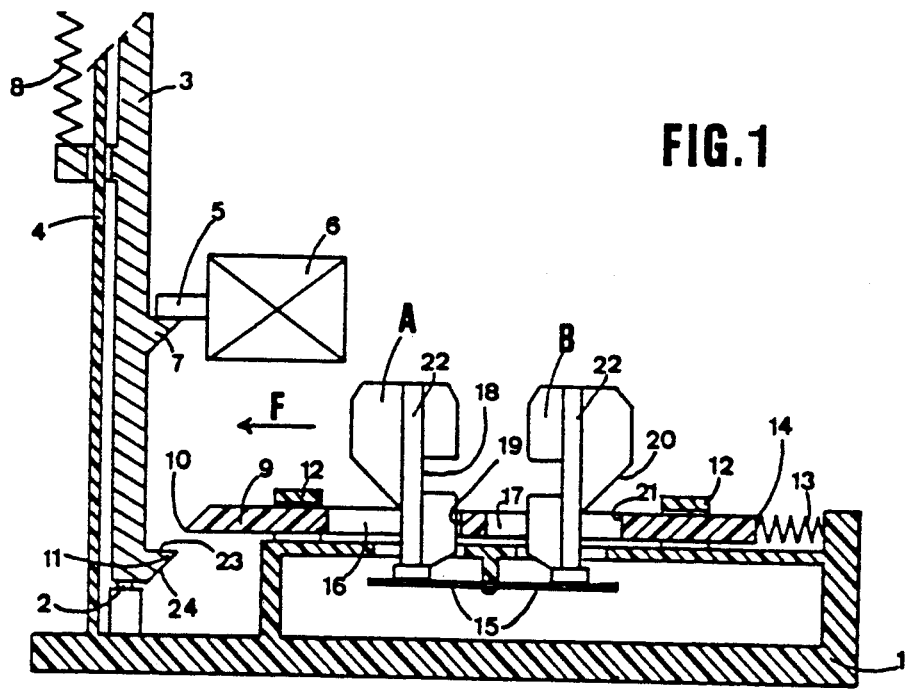
FIG. 1 shows in vertical cross section the device for keeping hot according to the present invention showing the latch in its automatic ejection position.

The toaster shown in FIG. 1 comprises a housing 1, a heating resistance (not shown) controlled by a switch 2 associated with a timer (not shown), a bread carriage (schematically shown at 3) guided vertically within the housing by means of a guide 4 and adapted to occupy at least two positions, either a toasting position (FIG. 1) in which the carriage 3 closes the switch 2 starting the timer, and to which the carriage 3 is moved by the user and maintained during the toasting cycle by means of a catch 5 moved by an electromagnet 6 controlled by the timer and which comes into engagement with an abutment 7 of the carriage 3, or a rest position to which the carriage 3 is brought by means of a return spring 8, at the end of the toasting cycle, when the catch 5 frees the abutment 7, so that the bread leaves the housing 1.

According to a particularly advantageous characteristic of the invention, the toaster comprises also a device for keeping the toast hot which comprises a movable latch 9 which can occupy two positions, either a so-called hot-keeping position (FIG. 2) in which at the end of the toasting cycle, the carriage 3 being displaced slightly toward its rest position so as to open the switch 2, thereby cutting the supply of the heating resistance, the active end 10 of the movable latch 9 is in engagement with a hook 11 carried by the carriage 3, or an automatic ejection position (FIGS. 1 and 3) in which the latch 9 is withdrawn and does not impede the movement of carriage 3.

Thus, at the end of the toasting cycle, according to whether the movable latch 9 is in its automatic toasting position or in its hot-keeping position, the toast is either ejected automatically from the toaster or kept in the toaster and, even though the heating resistance is no longer supplied because of the opening of the switch 2, the residual heat given off from the sheet metal of the housing 1 is largely sufficient to maintain the toast at a desired temperature until the user wishes to consume it.

The movable latch 9 is slidably horizontally mounted by manipulating means A-B in a direction F transverse to the movement of carriage 3. The latch being in the shape of a plate, it slides between rails 12 secured to housing 1.

This slidable movement of movable latch 9 toward carriage 3, called the latching direction F, is ensured by the compression spring 13 acting between the housing 1 and the inactive end 14 of latch 9.

The manipulating means of the movable latch 9 comprise two push buttons A-B adapted to be manipulated alternatively and slidably mounted transversely to the latching direction F in contact with a leaf spring 15 common to the two buttons A and B, namely a first so-called hot-keeping button A which can occupy a blocking position (FIGS. 1 and 3) in which it blocks the latch 9 in the automatic ejection position, and an engagement position (FIG. 2) in which it permits the latch 9 to occupy its hot-keeping position, and a second so-called automatic ejection button B which can occupy an unblocking position (FIG. 3) in which it acts on the latch 9 to move it to its automatic ejection position and permits the so-called hot-keeping button A to move from its engagement position to its blocking position, and a release position (FIGS. 1 and 2) in which it permits the so-called hot-keeping button A to pass from its blocking position to its engagement position.

The latch having two openings 16, 17 through which the push buttons A-B pass, the so-called hot-keeping button A comprises a recess 18 opening opposite to the latching direction F, in which there comes to rest in the engagement position (FIG. 2) a corresponding edge 19 of the first opening 16, while the so-called automatic ejection button B comprises a cam 20 oriented opposite to the latching direction F, and adapted in unblocking position (FIG. 3) to come to bear against the corresponding edge 21 of the second opening 17 so as to cause the latch 9 to slide from its hot-keeping position to its automatic ejection position.

Each button A-B is guided vertically by means of lateral ribs 22 coming into engagement with corresponding grooves (not shown) provided in the housing 1.

According to another characteristic of the invention, the hook 11 of carriage 3 has, opposite the surface 23 adapted to come into engagement with the active end 10 of latch 9, a surface 24 inclined such that, the latch 9 being in its hot-keeping position during displacement of the carriage from its rest position to its toasting position, the inclined surface 24 comes to bear on the active end 10 of latch 9 which slides toward its automatic ejection position.

The different stages of operation of the toaster will now be described.

At the outset, carriage 3 is in its rest position, the catch 5 of electromagnet 6 is withdrawn. The user places the bread slices in the carriage 3 and moves the carriage 3 to its toasting position (FIG. 1). The carriage 3 closes switch 2 thereby supplying the heating resistance and starting the timer which controls electromagnet 6 such that the catch 5 comes into engagement with the carriage 3 at the level of abutment 7. The latch 9 is in its automatic ejection position, which is to say that the hot-keeping button A is in its blocking position and automatic ejection button B in its disengaged position. If the user does nothing before the end of the toasting cycle, the timer stops and controls the electromagnet 6 which withdraws the catch 5 thereby freeing the abutment 7. The return spring 8 returns the carriage 3 to its rest position, opening the switch 2 which cuts the supply to the heating resistance, thus ejecting the toast from the housing 1.

Figure 2:
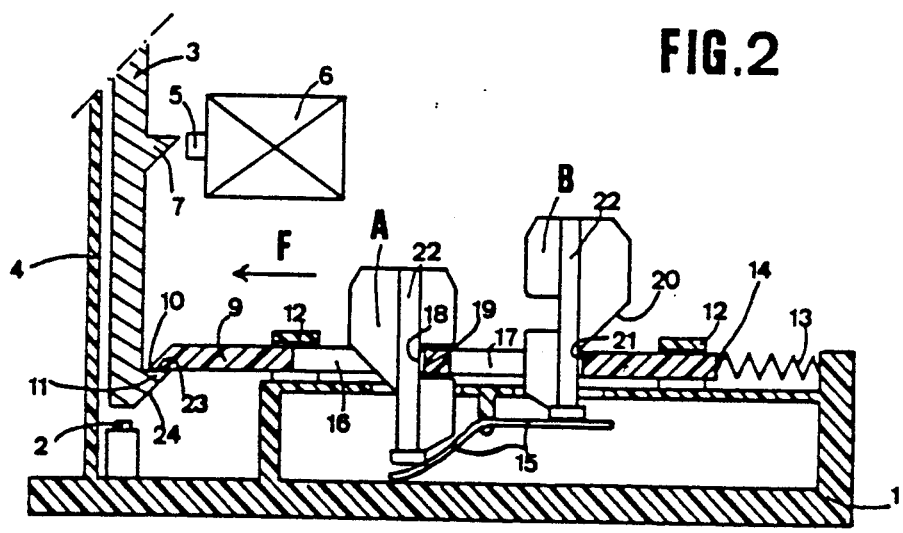
FIG. 2 is a view similar to FIG. 1 showing the latch in its hot-keeping position.
Figure 3:
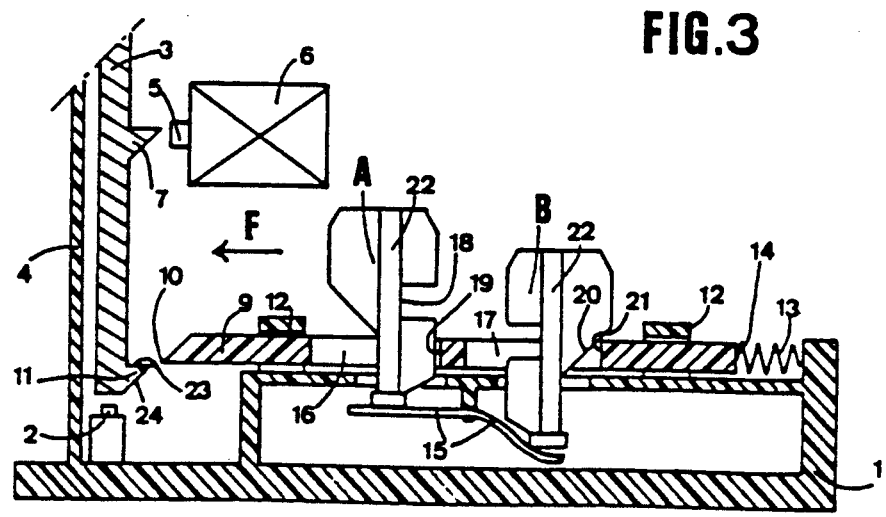
FIG. 3 is a view similar to FIG. 1 showing the latch back in its automatic ejection position.

If on the contrary the user wishes to maintain the toast hot, he actuates before the end of the toasting cycle the heat keeping button A so as to move it from its blocking position to its engagement position (FIG. 2). Recess 18 of said button A permits latch 9 urged by spring 13 to slide toward its hot-keeping position. At the end of the toasting cycle the timer stops and controls electromagnet 6 which withdraws catch 5. Carriage 3 thus freed begins its movement toward its rest position and opens switch 2 which cuts the supply of the heating resistance. The movement of the carriage is stopped as soon as hook 11 comes into engagement with the active end 10 of latch 9, maintaining the toast hot in the housing.

When the user desires to eject the toast (FIG. 3), he operates the automatic ejection button B so as to move it from its disengagement to its unblocking position. Cam 20 bears on the corresponding edge 21 of second opening 17 causing latch 9 to slide under the action of compression spring 13 from its hot-keeping position to its automatic ejection position. In the course of this sliding, the hot-keeping button A is automatically returned to its blocking position by leaf spring 15. Hook 11 of carriage 3 is then free and the carriage 3 is returned toward its rest position by return spring 8, thus ejecting the toast from the housing 1.

As will be understood, when latch 9 is in its hot-keeping position while carriage 3 is in its rest position, the lowering of this carriage 3 to its toasting position brings the inclined surface 24 of hook 11 to bear against the active end 10 of latch 9 thereby automatically pushing latch 9 back toward its automatic ejection position.

What is claimed is:

1. Toaster comprising a housing (1), a switch (2) for controlling electric power supply to the toaster, a bread carriage (3) guided within the housing and adapted to occupy either a toasting position in which the carriage (3) closes the switch (2), and in which the carriage (3) is moved by the user and maintained during the toasting cycle by a catch (5) operated by an electromagnet (6) which comes into engagement with an abutment (7) of the carriage (3), or a rest position into which the carriage (3) is moved by means of a return spring (8), at the end of the toasting cycle, when the catch (5) frees the abutment (7), a hot-keeping device for the toast comprising a latch (9) movably mounted between a hot-keeping position in which at the end of the toasting cycle the carriage (3) being displaced slightly toward its rest position so as to open the switch (2), the movable latch (9) is in engagement with a hook (11) carried by the carriage (3) to prevent further displacement of the carriage thereby to retain the toast in the toaster, and an automatic ejection position in which the latch (9) is withdrawn and does not prevent the displacement of the carriage (3) to eject the toast from the toaster, wherein the movable latch (9) is slidably mounted in the toaster, and manipulating means (A-B) for sliding the movable latch (9) in a direction (F) transverse to the movement of the carriage (3).

2. Toaster according to claim 1, wherein the sliding of the movable latch (9) toward the carriage (3) in a latching direction (F), is effected by resilient means (13).

3. Toaster according to claim 2, wherein the means for moving the movable latch (9) comprise two push buttons (A, B) arranged to be manipulated alternatively and slidably mounted transversely to said latching direction (F) in contact with elastic members (15), said push buttons (A, B) comprising a first hot-keeping button (A) which can occupy a blocking position in which it blocks the latch (9) in its automatic ejection position, and an engagement position in which it permits the latch (9) to occupy it hot-keeping position, and a second automatic ejection button (B) which can occupy an unblocking position in which it acts on the latch (9) to return the latch (9) to its automatic ejection position and permits said hot-keeping button (A) to move from its engagement position to its blocking position, and a disengagement position in which the latch (9) permits the said hot-keeping button (A) to pass from its blocking position to its engagement position.

4. Toaster according to claim 3, wherein the latch (9) has the form of a plate having two openings (16, 17) traversed by the push buttons (A, B), the hot-keeping button (A) comprising a recess (18) opening opposite to said latching direction (F), into which in the engagement position a corresponding edge (19) of the first opening (16) comes into engagement, while the automatic ejection button (B) comprises a cam (2) directed oppositely to the direction of latching (F), and adapted in unblocking position to bear against a corresponding edge (21) of the second opening (17) so as to cause the latch (9) to slide from its hot-keeping position to its automatic ejection position.

5. Toaster according to claim 1, wherein the hook (11) has, opposite a surface (23) which comes into engagement with an active end (10) of the latch (9) when said latch is in the hot-keeping position, a surface (24) inclined such that, the latch (9) being in the hot-keeping position during displacement of the carriage from the rest position to the toasting position, the inclined surface (24) comes to bear on an active end (10) of the latch (9) which latch thereupon slides toward its automatic ejection position.

* * * * *

UNITED STATES PATENT AND TRADEMARK OFFICE
CERTIFICATE OF CORRECTION

PATENT NO. : 5,018,437
DATED : May 28, 1991
INVENTOR(S) : Antonio BASORA SAN JUAN It is certified that error appears in the above—identified patent and that said Letters Patent is hereby corrected as shown below:

ON TITLE PAGE: immediately under [19], change "San Juan" to --Basora San Juan--.

In Item [76], change the name of the inventor to --Antonio Basora San Juan--.

Signed and Sealed this

Twenty-eighth Day of April, 1992

Attest:

HARRY F. MANBECK, JR.

*Attesting Officer*  *Commissioner of Patents and Trademarks*